United States Patent
Hentschel et al.

(10) Patent No.: US 11,913,363 B2
(45) Date of Patent: Feb. 27, 2024

(54) METHOD FOR MANUFACTURING A PISTON INDICATOR FOR A CAMSHAFT

(71) Applicant: MAHLE International GmbH, Stuttgart (DE)

(72) Inventors: Tilo Hentschel, Hattenhofen (DE); Mathias Rummel, Rechberghausen (DE); Christoph Steinmetz, Ludwigsburg (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/211,976

(22) Filed: Jun. 20, 2023

(65) Prior Publication Data

US 2023/0407769 A1    Dec. 21, 2023

(30) Foreign Application Priority Data

Jun. 20, 2022    (DE) .................... 10 2022 206 134.9

(51) Int. Cl.
*F01L 1/04*     (2006.01)
*B21D 53/26*    (2006.01)
*F01L 1/047*    (2006.01)

(52) U.S. Cl.
CPC ............ *F01L 1/047* (2013.01); *B21D 53/264* (2013.01); *F01L 2301/00* (2020.05); *F01L 2303/00* (2020.05)

(58) Field of Classification Search
CPC ... F01L 1/047; F01L 1/344; F01L 1/04; F01L 2303/00; F01L 2301/00; F01L 2001/0473; F01L 2001/0471; F01L 2001/0475; F01L 2001/34459; F01L 2820/041; F01L 2820/042; F01L 2820/04; F01L 2250/06; F01L 13/0057; F01L 2800/11; F01L 2009/2169; F01L 2009/2167; B21D 53/264; B21D 53/845; F16C 3/02; F16C 3/06; F16C 35/063; F16C 33/64; F16C 33/121; F16C 2360/18; F16C 2360/22
See application file for complete search history.

(56) References Cited

U.S. PATENT DOCUMENTS

| | | | |
|---|---|---|---|
| 6,418,897 B1 * | 7/2002 | Urban | F01L 1/3442 123/90.37 |
| 10,427,206 B1 * | 10/2019 | Camilo | F01L 1/3442 |
| 11,603,807 B2 * | 3/2023 | Joseph | F02D 41/009 |

(Continued)

FOREIGN PATENT DOCUMENTS

| | | |
|---|---|---|
| DE | 10209754 A1 | 9/2003 |
| JP | 2006281296 A | 10/2006 |

OTHER PUBLICATIONS

English abstract for DE-DE10209754A1.

(Continued)

*Primary Examiner* — Mark A Laurenzi
*Assistant Examiner* — Dapinder Singh
(74) *Attorney, Agent, or Firm* — Fishman Stewart PLLC

(57) ABSTRACT

A method for manufacturing a position indicator sensor wheel for a camshaft is disclosed. The position indicator includes an axially extending passage for connecting to the camshaft and at least one radially projecting tooth. The method includes providing a sheet from a sheet material; introducing the passage into the sheet; and roughening a radial inner surface of the passage in at least one rough portion.

20 Claims, 2 Drawing Sheets

(56) References Cited

U.S. PATENT DOCUMENTS

2008/0276888 A1* 11/2008 Muster .................. F16H 53/025
123/90.6
2014/0360254 A1* 12/2014 Deringer .............. H02K 11/215
73/114.26

OTHER PUBLICATIONS

English abstract for JP-2006-281296.
German Search Report for DE-102022206134.9, dated Mar. 2, 2023.
Norm DIN EN 10130 2007-04-00, Cold Rolled low carbon steel flat products for cold forming—Technical delivery conditions.
Norm DIN EN 10130 2007-02-00, Cold Rolled low carbon steel flat products for cold forming—Technical delivery conditions.

* cited by examiner

METHOD FOR MANUFACTURING A PISTON INDICATOR FOR A CAMSHAFT

CROSS-REFERENCE TO RELATED APPLICATION

This application claims priority to German Patent Application No. DE 10 2022 206 134.9, filed on Jun. 20, 2022, the contents of which is hereby incorporated by reference in its entirety.

TECHNICAL FIELD

The present invention relates to a method for manufacturing a position indicator for a camshaft which comprises a joint seat for connecting to the camshaft and at least one projecting tooth. Further, the invention relates to a position indicator manufactured in such a manner. In addition, the invention relates to a method for manufacturing a camshaft having such a position indicator and to such a camshaft.

BACKGROUND

A camshaft is usually employed for actuating valves of an internal combustion engine. Such a camshaft usually comprises at least one cam body. During the operation, the camshaft with the cam body rotates about an axis of rotation in order to for example actuate the valves. In the process it is desirable, in particular for controlling the camshaft and/or the associated internal combustion engine, to know the relative rotary position of the camshaft.

It is conceivable for this purpose to non-rotatably connect a position indicator with a shaft of the camshaft, wherein the position indicator usually has a contour that varies in the circumferential direction and interacts with a sensor which, by way of the varying contour, determines the relative position of the position indicator and thus of the shaft that is non-rotatably connected to the position indicator.

The present invention deals with the object of stating for a method for manufacturing a position indicator of the type mentioned at the outset, for such a position indicator, for a method for manufacturing a camshaft of the type mentioned at the outset having such a position indicator and for such a camshaft, improved or at least other embodiments, which in particular eliminate disadvantages from the prior art. In particular, the present invention deals with the object of stating for the method for manufacturing the position indicator, for the position indicator, for the method for manufacturing the camshaft and for the camshaft improved or at least other embodiments, which are characterised by an increased stability and/or a cost-effective manufacture.

According to the invention, this object is solved through the subjects of the independent claim(s). Presentation of the embodiments are the subject of the dependent claim(s).

SUMMARY

Accordingly, the present invention is based on the general idea of manufacturing a position indicator for a camshaft from sheet metal and roughen at least regionally an inner surface of a passage of the position indicator by means of which the position indicator is non-rotatably joined to a shaft of the camshaft. The manufacture of the position indicator from sheet metal results in a cost-effective and simple manufacture of the position indicator, in particular compared with such position indicators that are manufactured by means of sintering. The roughening of the inner surface of the passage results in that the friction value of the inner surface on the shaft is increased and the position indicator is thus connected to the shaft in a mechanically more stable manner, so that the position indicator is more stable relative to the shaft and better secured both with respect to axial displacements and also with respect to displacement in the circumferential direction. This means that the position indicator, with a more cost-effective and simple manufacture, thus has an improved tight fit on the shaft. At the same time, the position indicator, in particular compared with position indicators manufactured by means of sintering, has a reduced weight. The result of the reduced weight is a reduction of the expansion of the position indicator under the effect of centrifugal force, from which a reduced expansion of the position indicator also in the joint seat and thus a more stable tight fit during the operation of the associated camshaft and of an associated internal combustion engine materialise. Further, mechanical damage to the position indicator during the joining with the shaft, in particular cracks of the position indicator, are prevented or at least reduced in this way.

According to the inventive idea, a sheet out of a sheet material is provided for manufacturing the position indicator, which comprises an axially extending joint seat and at least one radially projecting tooth. The passage is introduced into the sheet and the radially inner surface of the passage roughened in at least one portion, which in the following is also referred to as rough portion.

In the state joined with the associated shaft, the passage fulfils the function of a joint seat. For the sake of simplicity, the passage and the joint seat are to be understood as corresponding to one another.

For manufacturing the position indicator, the sheet, further, is advantageously formed.

It is conceivable in particular to further cut free the sheet for manufacturing the at least one tooth.

The camshaft comprises a shaft that is rotatable about an axial axis of rotation to which the position indicator, by means of the joint seat, is joined and thus connected in an axially fixed and non-rotatable manner.

The directions stated here relate to the axial axis of rotation of the shaft and thus of the position indicator. Thus, "axial" runs parallel in particular coaxially to the axis of rotation. In addition, "radial" runs transversely to the axis of rotation and thus transversely to axial. Further, the circumferential direction runs so as to surround the axis of rotation "axially".

The joint seat has a joining geometry and is that point of the position indicator via which the position indicator is joined with the shaft of the camshaft. The joint seat can thus also be referred to as joining point.

The camshaft can merely comprise a single shaft.

The camshaft can also comprise two shafts, wherein an inner one of the shafts is arranged radially within an outer one of the shafts. The position indicator is connected to or joined with one of the shafts, preferably to the outer shaft.

The position indicator serves the purpose of determining the relative rotary position of the camshaft. For this purpose, the position indicator comprises the at least one radially projecting tooth which leads to a change of the outer contour of the position indicator. The position indicator interacts with a sensor. By means of the at least one tooth, the sensor determines the relative rotary position of the position indicator and thus of the shaft and consequently the camshaft joined to the position indicator.

Advantageously, the camshaft comprises at least one cam body which is preferentially axially spaced apart from the position indicator. The respective cam body is non-rotatably connected to one of the at least one shafts of the camshaft, thus rotates with the camshafts during the operation. With the at least one cam body it is possible for example to actuate at least one valve in an associated internal combustion engine.

The roughening of the respective at least one rough portion can basically take place prior to manufacturing the at least one tooth or after manufacturing the at least one tooth.

Basically, the position indicator can be manufactured with a single such tooth.

Preferably, the position indicator is manufactured with at least two teeth which project radially and are spaced apart from one another in the circumferential direction. The teeth are separated from one another in the circumferential direction by tooth gaps.

The teeth of the position indicator can basically have the same shape and/or size. The same applies to the tooth gaps.

Preferred are embodiments in which at least two of the at least two teeth have shapes and/or sizes that are distinct from one another. The same applies to tooth gaps. It is thus possible to more easily and more precisely determine the relative rotary position of the position indicator.

Basically, the joint seat can be introduced into the sheet in any way.

Advantageously, a passage is initially introduced, preferentially punched into the sheet for introducing the joint seat, wherein the passage has a smaller diameter than the future joint seat. Thus, the joint seat can be manufactured more easily and more precisely.

Advantageously, the passage is expanded and calibrated to form the joint seat by means of a mandrel. The mandrel is referred to as calibrating mandrel in the following. The joint seat is manufactured by means of the calibrating mandrel preferentially in such a manner that the inner surface of the joint seat is as smooth as possible. The use of the calibrating mandrel thus results in a precise and simple introduction of the joint seat into the sheet. At the same time, a simpler and more precise roughening of the inner surface is thus made possible.

Embodiments are considered advantageous, in which the joint seat is introduced into the sheet in such a manner that the joint seat is formed in an axially projecting flange of the position indicator. Thus, the joint seat has an axially enlarged inner surface and consequently axially larger rough portions. As a consequence, a more stable connection between the position indicator and the shaft of the camshaft can be established and the tight fit thus improved. The at least one rough portion is preferably introduced into the inner surface after the manufacture of the flange.

The respective at least one rough portion can basically have any roughness.

Embodiments are considered advantageous, in which the at least one rough portion is roughened in such a manner that the rough portion has a mean roughness depth Rz between 5 and 30. Thus, a simplified manufacture of the position indicator is accompanied at the same time by an adequately tight fit of the position indicator on the shaft.

The position indicator is preferably entirely manufactured out of the sheet, i.e. a so-called sheet position indicator.

The sheet for manufacturing the position indicator can have any thickness. For example, the sheet has a material thickness between 0.8 and 5.0 mm.

The sheet material is advantageously steel. Thus, the sheet is advantageously made of steel. Thus, the mechanical stability of the position indicator is increased.

Preferably, the sheet material is cold-formable steel. Thus, besides the mechanical stability of the position indicator a simplified and cost-effective manufacture of the position indicator is achieved.

The cold-formable steel is preferably one such steel according to DIN 10130, for example one such steel according to "DC01" to "DC04".

Basically it is conceivable to rough the entire inner surface of the joint seat.

In preferred embodiments, at least two rough portions spaced apart from one another are introduced in the inner surface. This means that the inner surface comprises the rough portions and at least one portion which is not roughened and in the following also referred to as smooth portion. Thus, a simplified and cost-effective manufacture of the position indicator is achieved. At the same time, the rough portions spaced apart from one another result in a more stable mechanical connection of the position indicator with the associated shaft and thus in an improved tight fit.

In preferred embodiments, at least two of the at least two rough portions, preferentially all rough portions, are spaced apart from one another in the circumferential direction. The inner surface is thus roughened in at least two rough portions spaced apart from one another in the circumferential direction, which are separated from one another in the circumferential direction by smooth portions. This results in particular in a more stable tight fit of the position indicator on the shaft in the circumferential direction. This means that the position indicator in this way is better secured mechanically against rotations on the shaft.

Preferably, at least two rough portions located radially opposite one another are introduced into the inner surface. This increases the stability of the tight fit of the position indicator on the shaft, in particular against rotations in the circumferential direction.

The size and/or shape and/or number of the rough portions are/is freely selectable and/or adjustable. In particular it is possible by means of the number and/or the angular position of the rough portions to stabilise and/or adapt the tight fit of the position indicator to given requirements.

The respective at least one rough portion can be introduced into the inner surface in any way.

It is conceivable that in at least one of the at least one rough portions the inner surface is shot-blasted with a roughening material for roughening.

The roughening material is preferably steel. Thus, the connection of the position indicator to the shaft is improved.

It is conceivable that the roughening material corresponds to the sheet material.

In preferred embodiments, the roughening material is distinct from the sheet material, in particular a steel that is distinct from the sheet material. This results in an improved mechanical connection of the position indicator to the shaft and thus in an improved tight fit.

Alternatively or additionally, in at least one of the at least one rough portions of the inner surface at least one embossment can be introduced into at least one of the at least one rough portions of the inner surface for roughening. Thus, the rough portion is formed integrally in the sheet material. This results in a more stable mechanical connection of the position indicator to the shaft and thus in an improved tight fit.

Basically, the respective at least one embossment can be of any kind.

It is conceivable that at least one of the at least one embossments is a dot embossment. This means that in at least one of the at least one rough portions a dot embossment is introduced.

It is conceivable that at least one of the at least one embossments is introduced by knurling. This means that at least one of the at least one rough portions is knurled for roughening.

Joining the position indicator with the shaft of the camshaft by means of the passage can basically take place in any way. This includes in particular joining methods by means of formless auxiliary substances, for example gluing and welding.

In particular, the position indicator according to the invention allows, because of the at least one rough portion, to join the position indicator with the shaft at room temperature. Accordingly, preferred are embodiments in which the position indicator is joined with the shaft at room temperature. This results in reduced costs during the manufacture of the camshaft.

Advantageously, the position indicator is joined with the shaft via the joint seat without auxiliary materials and auxiliary elements.

Preferably, the position indicator is joined with the shaft via the joint seat by means of a press fit. This results in a mechanically stable connection of the position indicator with the shaft.

Preferentially, the position indicator is joined with the shaft via the joint seat by means of a longitudinal press fit. In particular, the joining of the position indicator with the shaft takes place by means of the longitudinal press fit and at room temperature. This results in a particularly simple manufacture of the camshaft with stable tight fit of the position sensor on the shaft at the same time.

It is to be understood that besides the method for manufacturing the position indicator and the camshaft a position indicator manufactured in such a manner and a camshaft manufactured in such a manner each also belong to the scope of this invention.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
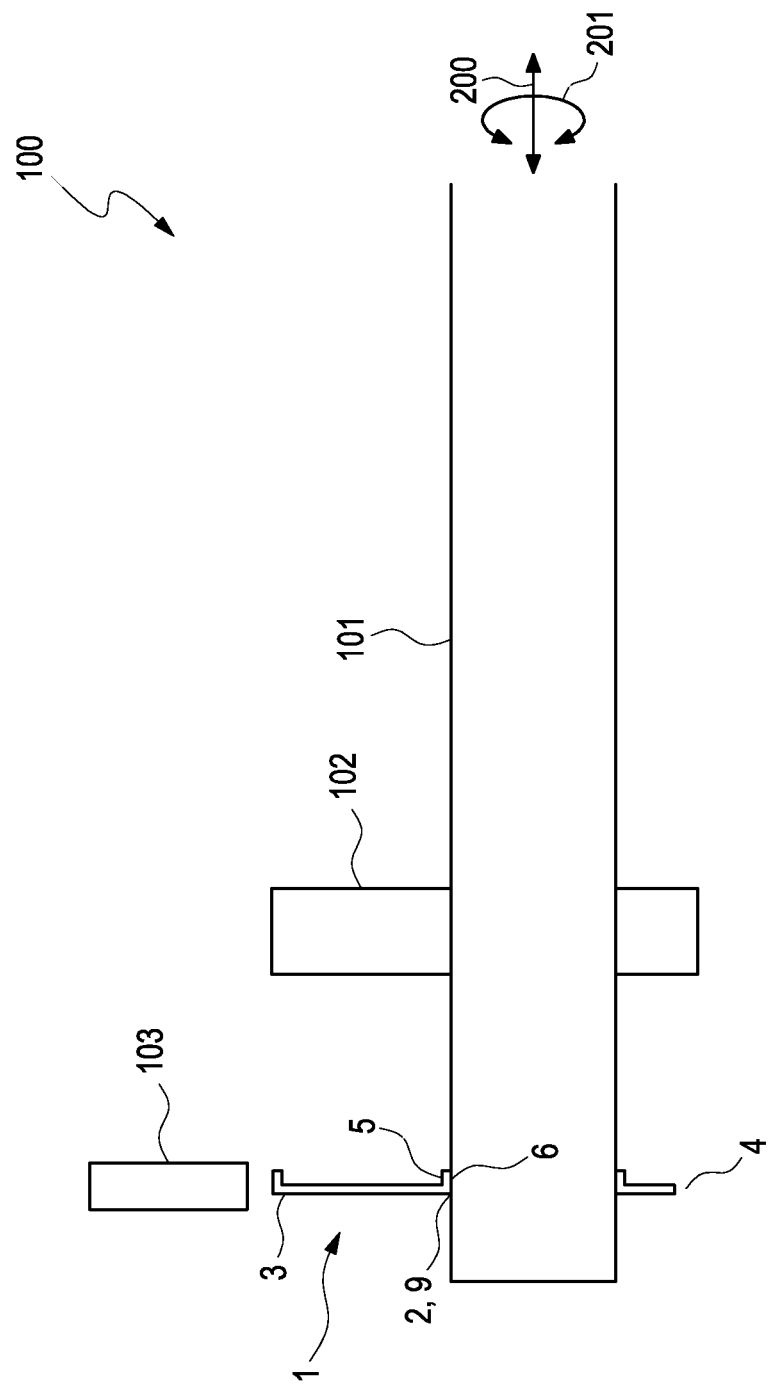
FIG. 1 a highly simplified section through a camshaft having a position indicator, FIG. 2 an isometric view of the position indicator.
Figure 2:
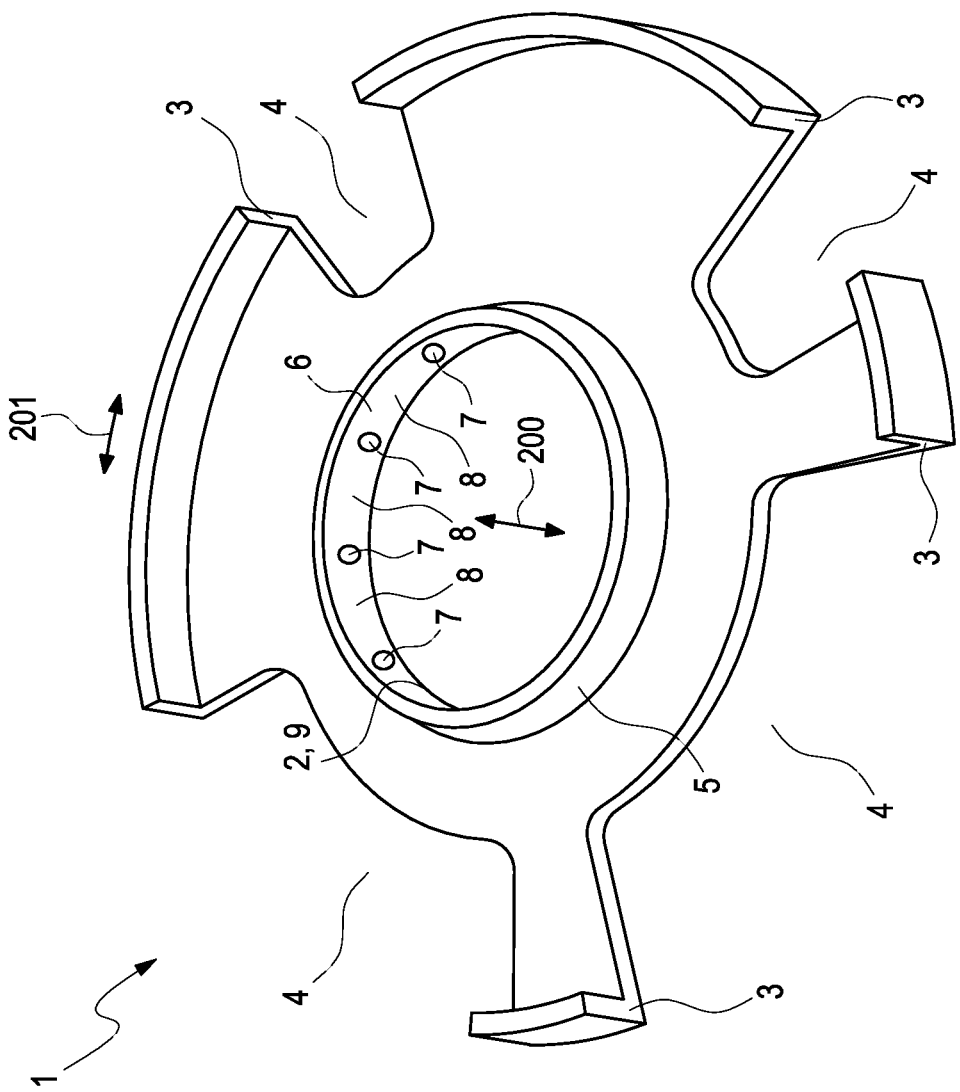

A position indicator 1, as is shown in the FIGS. 1 and 2, is employed in a camshaft 100 shown in FIG. 1 in a greatly simplified manner. In the exemplary embodiment shown in FIG. 1, the camshaft 100 purely exemplarily comprises a single shaft 101, with which the position indicator 1 is joined. It is also conceivable that the camshaft 102 comprises shafts (not shown) which are arranged within one another and are adjustable relative to one another. The shaft 101 is rotatable about an axial axis of rotation 200 and during the operation rotates about the axis of rotation 200. The position indicator 1 is joined with a shaft 101 of the camshaft 100 so as to be non-rotatable and axially fixed. For this purpose, the position indicator 1 comprises an axial passage 9 which in the state joined with the shaft 101 assumes the function of a joint seat 2, by means of which the position indicator 1 is joined with the shaft 101. In the present context, the passage 9 and the joint seat 2 are to be understood as corresponding to one another. The camshaft 1, further, comprises cam bodies 102 that are non-rotatably connected to the shaft 101, which in an associated internal combustion engine which is not otherwise shown can actuate valves. In FIG. 1, a single such cam body 102 is shown.

The directions stated here relate to the axial axis of rotation 200 of the shaft 101, which corresponds to the axis of rotation 200 of the position indicator 1. Accordingly, "axial" runs parallel, in particular coaxially to the axis of rotation 200. Further, "radial" runs transversely to the axis of rotation 200 or transversely to axial. In addition, the circumferential direction 200 runs so as to surround the axis of rotation 200.

During the operation, the position indicator 1 rotates with the shaft 101 and interacts with a sensor 103, in order to determine the relative rotary position of the camshaft 100, in particular of the cam bodies 102. For this purpose, the position indicator 1 has a contour that changes in the circumferential direction 200. As is evident in particular from FIG. 2, the position indicator 1 for this purpose comprises at least one radially projecting tooth 3. Thus it is possible for example to control the camshaft 100 and/or the associated internal combustion engine that is not shown.

In the exemplary embodiment shown in FIG. 2, the position indicator 1 purely exemplarily comprises four such teeth 3, wherein the teeth 3 are separated from one another in the circumferential direction 201 by tooth gaps 4. In the shown exemplary embodiment, the teeth 3 purely exemplarily extend differently in the circumferential direction 201.

The position indicator 1 is manufactured from a sheet, i.e. is in particular a sheet position indicator 1. For manufacturing the position indicator 1, a sheet from a sheet material is provided. The joint seat 2 is advantageously manufactured in that initially a passage (not shown) is introduced into the sheet, for example punched. The passage 6 is expanded and calibrated to form the joint seat 2 using a calibrating mandrel that is not shown. The joint seat 2 is introduced in the shown exemplary embodiments in such a manner that the joint seat 2 is formed in an axially projecting flange 5. Further, the sheet is formed and cut free in such a manner that the teeth 3 and the tooth gaps 4 are formed. The passage 9, which then assumes the function of the joint seat 2, has a radial inner surface 6. As is merely evident from FIG. 2, the inner surface 6 is roughened in at least one portion 7, which in the following is also referred to as rough portion 7. Thus, a more stable non-rotatable and axially fixed connection between the position indicator 1 and the shaft 101 and thus an altogether more stable tight fit of the position sensor 1 on the shaft 101 materialises. At the same time, the position indicator 1 is cost-effective and has a reduced weight. Preferably, the inner surface 6 is roughened in the at least one rough portion 7 in such a manner that the at least one rough portion 7 has a mean roughness depth Rz between 5 and 30.

Advantageously, the sheet is a formable preferably cold-formable steel. For example, the sheet consists of a steel according to DIN 10130, in particular steel according to "DC01" to "DC04".

Basically, the entire inner surface 6 of the joint seat 2 can be roughened.

In the exemplary embodiment shown in FIG. 2, at least two rough portions 7 are introduced into the inner surface 6. In FIG. 2, the rough portions 7 are indicated in a simplified manner by circles. The rough portions 7 are separated from one another in the circumferential direction 201 by portions 8, which are unroughened, i.e. free of such roughening and are also referred to as smooth portions 8 in the following. In the shown exemplary embodiment, rough portions 7 and smooth portions 8 thus alternate in the circumferential direction 201. In the shown exemplary embodiments, the rough portions 7 are additionally introduced locally and at points in the inner surface 6.

The respective rough portions 7 can be introduced into the inner surface 6 in any way.

At least one of the rough portions 7, in particular all rough portions 7, can be shot-blasted with a roughening material for roughening. This means that at least one of the rough portions 7, in particular the respective rough portion 7, is manufactured by means of shot-blasting with the roughening material. The roughening material is preferentially distinct from the sheet material and preferably likewise a steel.

At least one of the rough portions 7, advantageously the respective rough portions 7, can alternatively or additionally be manufactured by an embossment of the inner surface 6. This means that in at least one of the at least one rough portions 7, advantageously in the respective rough portions 7, at least one embossment is introduced for roughening. The embossment can be a dot embossment. Likewise, the embossment can be a knurling. This means that at least one of the rough portions 7 is knurled for roughening.

The position indicator 1, in particular the inner surface 6 with the at least one rough portion 7 allows joining the position indicator 1 with the shaft 101 by a press fit, wherein the press fit can take place at room temperature. The position indicator 1 is preferably joined with the shaft 101 by means of a longitudinal press fit.

The invention claimed is:

1. A method for manufacturing a position indicator sensor wheel for a camshaft, wherein the position indicator comprises an axially extending passage for connecting to the camshaft and at least one radially projecting tooth, the method comprising:
   providing a sheet from a sheet material,
   introducing the passage into the sheet, and
   roughening a radial inner surface of the passage in at least one rough portion.

2. The method according to claim 1, wherein the radial inner surface of the passage is roughened in at least two rough portions spaced apart from one another in a circumferential direction, the at least two rough portions separated from one another by unroughened smooth portions in the circumferential direction.

3. The method according to claim 1, wherein on the at least one rough portion the radial inner surface is shot-blasted with a roughening material for roughening.

4. The method according to claim 3, wherein the roughening material used for shot-blasting differs from the sheet material.

5. The method according to claim 3, wherein the roughening material is composed of steel.

6. The method according to claim 1, wherein the sheet material is a sheet made of steel.

7. The method according to claim 1, wherein roughening the radial inner surface includes introducing at least one embossment into the at least one rough portion.

8. The method according to claim 7, wherein into the at least one rough portion at least one dot embossment is introduced.

9. The method according to claim 7, wherein the at least one rough portion is knurled for roughening.

10. The method according to claim 1, wherein the at least one rough portion is roughened such that the at least one rough portion has a mean roughness depth between 5 and 30.

11. A position indicator for a camshaft, wherein the position indicator is manufactured in accordance with the method according to claim 1.

12. A method for manufacturing a camshaft for an internal combustion engine, comprising:
    providing a shaft,
    providing a position indicator, the position indicator including an axially extending passage for connecting to the shaft and at least one radially projecting tooth, wherein providing the position indicator includes:
    providing a sheet from a sheet material,
    introducing the passage into the sheet, and
    roughening a radial inner surface of the passage in at least one rough portion,
    joining the position indicator with the shaft via the passage, so that the position indicator is connected to the shaft so as to be axially fixed and non-rotatable.

13. The method according to claim 12, wherein the position indicator is joined with the shaft at room temperature.

14. The method according to claim 12, wherein the position indicator is joined with the shaft via a press fit.

15. The method according to claim 12, wherein roughening the radial inner surface of the passage includes roughening the radially inner surface in at least two rough portions spaced apart from one another in a circumferential direction and separated from one another by an unroughened smooth portion in the circumferential direction.

16. The method according to claim 12, wherein the sheet material is made of cold-formable steel.

17. The method according to claim 12, wherein the position indictor is joined with the shaft via a longitudinal press-fit.

18. A camshaft for an internal combustion engine, comprising:
    a shaft,
    a position indicator, the position indicator including an axially extending passage and at least one radially projecting tooth, the passage having a radial inner surface provided with at least one roughened portion, wherein the position indicator is joined with the shaft via the passage so as to be axially fixed and non-rotatable.

19. The camshaft according to claim 18, wherein the radial inner surface of the passage includes at least two rough portions spaced apart from one another in a circumferential direction and separated from one another by an unroughened smooth portion in the circumferential direction.

20. The camshaft according to claim 18, wherein the position indicator is press-fitted to the shaft.

* * * * *